May 9, 1944.  E. L. VIDAL ET AL  2,348,316
LAMINATED STRUCTURE
Filed Sept. 12, 1940  5 Sheets-Sheet 2

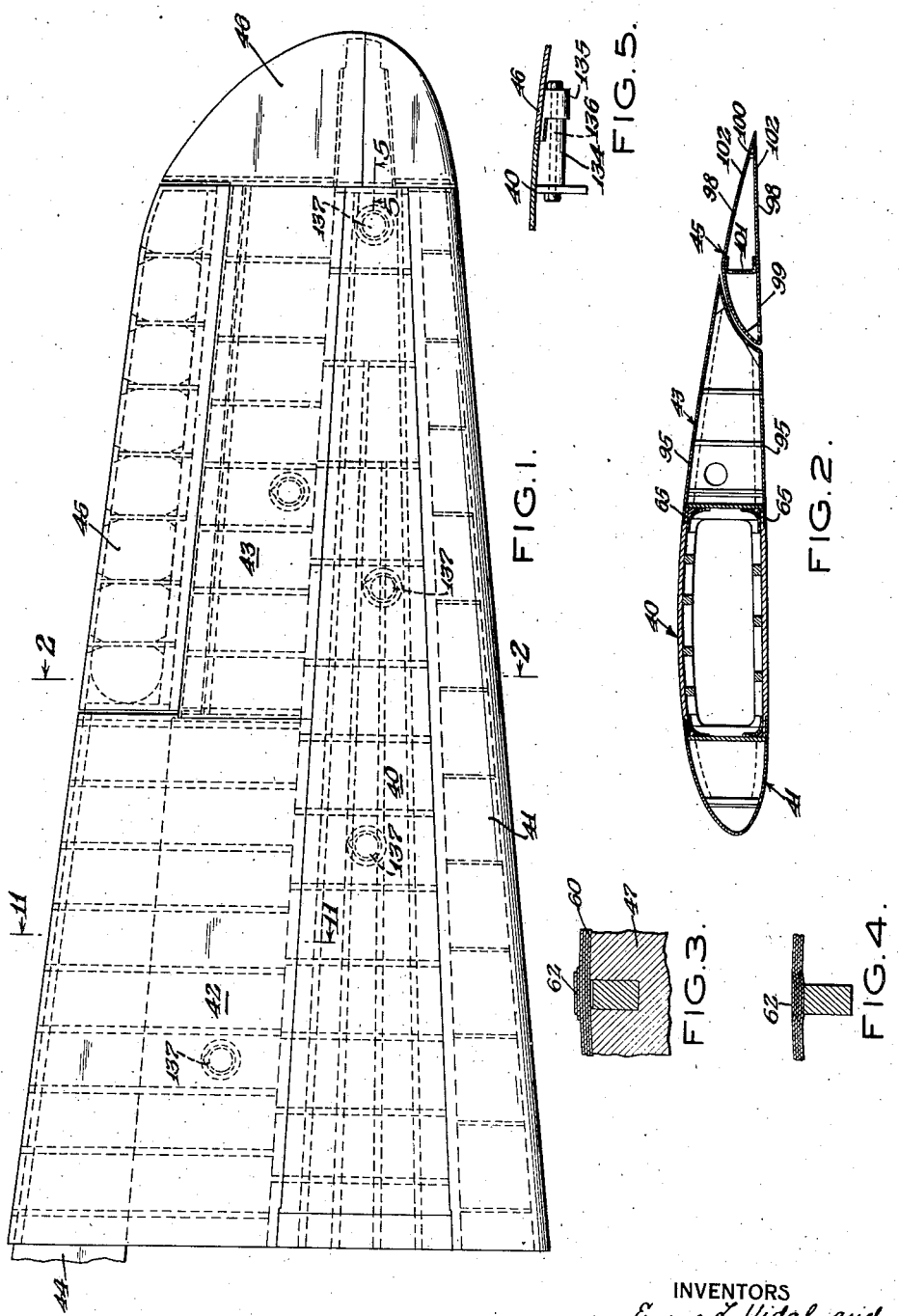

INVENTORS
Eugene L. Vidal and
BY Laurence J. Markoefer
F. Bascom Smith
ATTORNEY

May 9, 1944. E. L. VIDAL ET AL 2,348,316
LAMINATED STRUCTURE
Filed Sept. 12, 1940 5 Sheets-Sheet 3
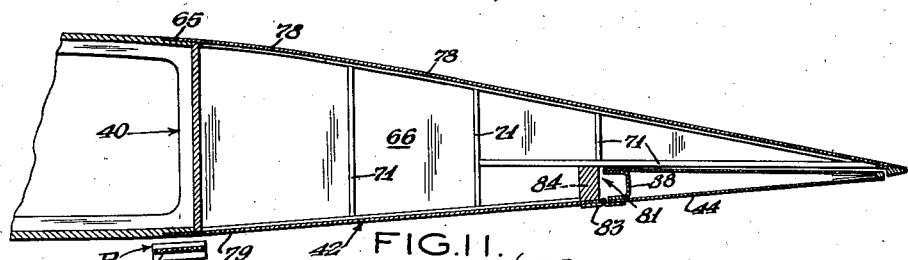
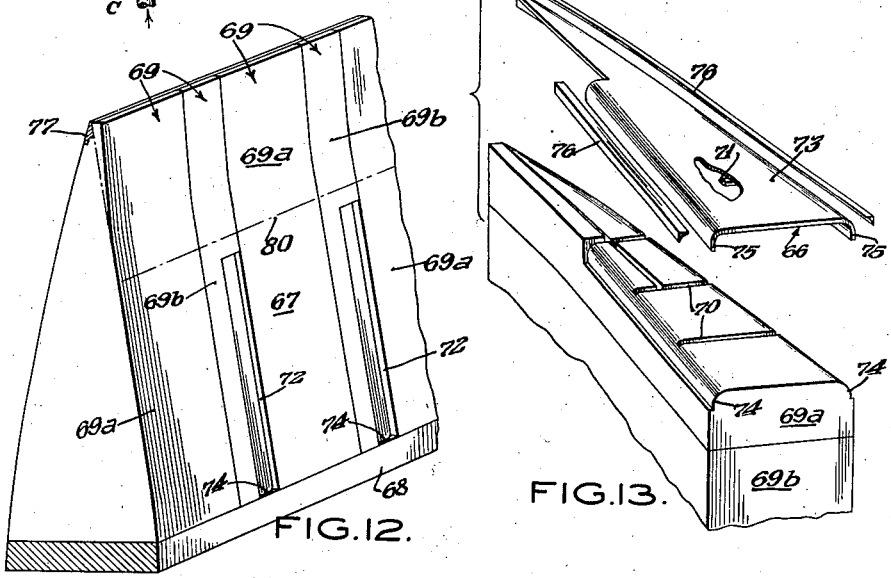
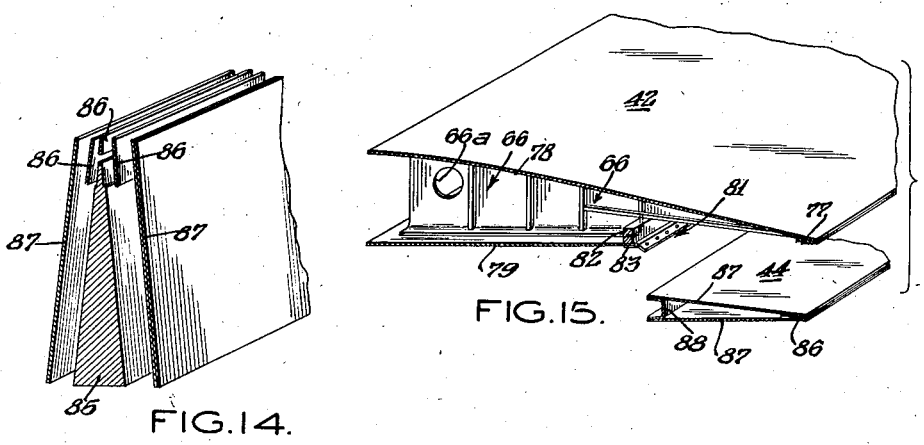
INVENTORS
Eugene L. Vidal and
BY Laurence J. Markofer
F. Bascom Smith
ATTORNEY

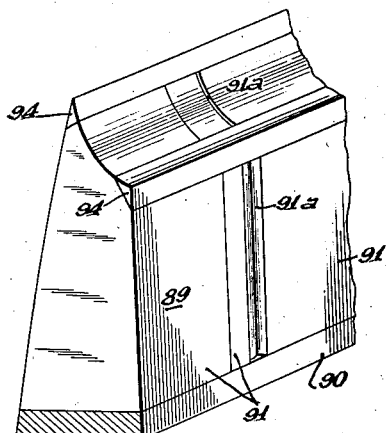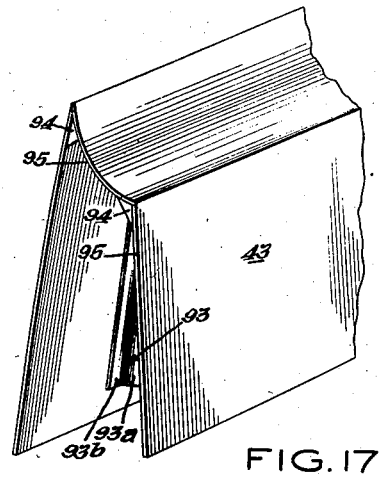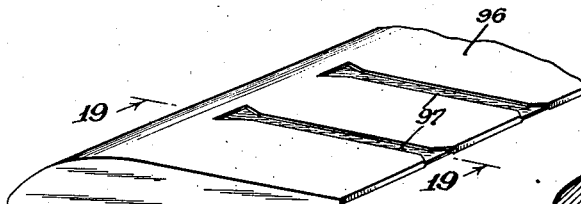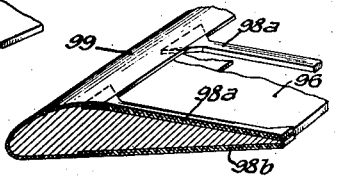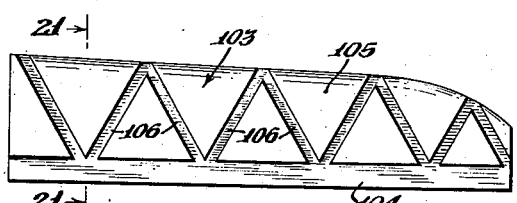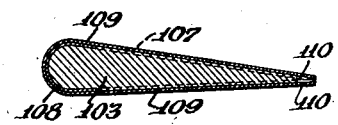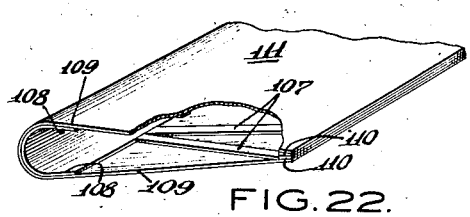

May 9, 1944.    E. L. VIDAL ET AL    2,348,316
LAMINATED STRUCTURE
Filed Sept. 12, 1940    5 Sheets-Sheet 5
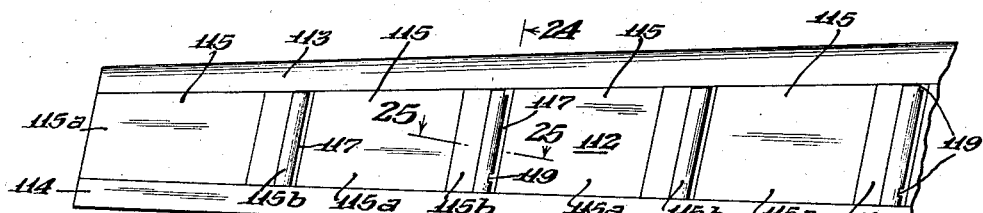
FIG. 23
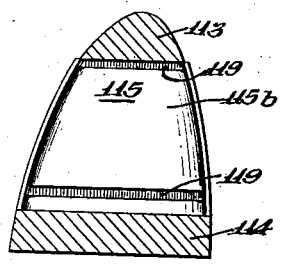
FIG. 24.
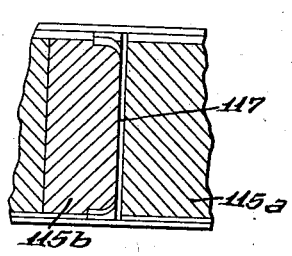
FIG. 25.
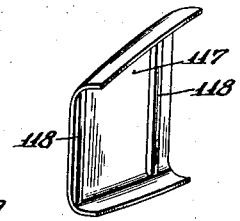
FIG. 26.
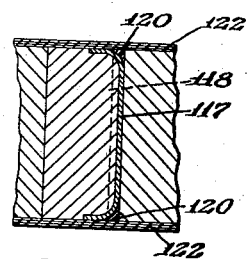
FIG. 27.
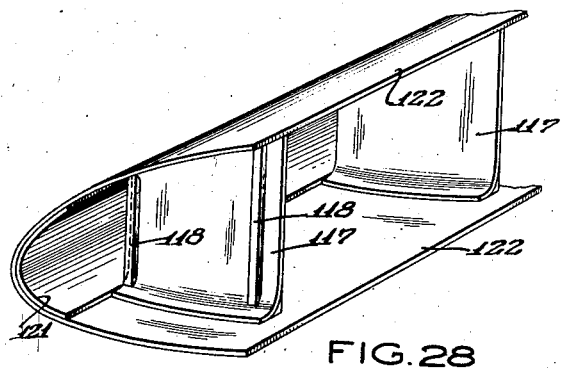
FIG. 28
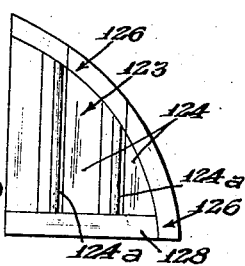
FIG. 29
FIG. 30
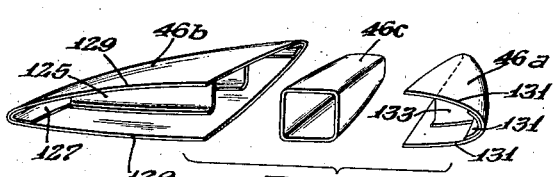
FIG. 31
INVENTORS
Eugene L. Vidal and
BY Laurence J. Marhoefer
F. Bascom Smith
ATTORNEY Patented May 9, 1944

2,348,316

UNITED STATES PATENT OFFICE 2,348,316

LAMINATED STRUCTURE

Eugene L. Vidal, New York, N. Y., and Laurence J. Marhoefer, Wood-Ridge, N. J., assignors, by mesne assignments, to Vidal Corporation, a corporation of Delaware Application September 12, 1940, Serial No. 356,426

2 Claims. (Cl. 244—123)

This invention relates to structures fabricated from laminations of adhesively treated material and to methods of making such structures.

The manufacture of airplane wings has heretofore been carried out by methods and with materials which are not adapted for quantity production, and which involve a considerable expenditure of time and labor. This is partly due to the fact that a framework comprised of transverse ribs and longitudinal spars must be first assembled and thereafter sections of the skin separately applied to said framework and to the fact that the thin skin is of a material requiring careful attention during fabrication and skilled workmanship during assembly. Accordingly, it is an object of the present invention to provide a novel method for rapidly and economically producing from sheets of readily accessible material, such as wood veneer, novel load carrying structures, such as aircraft wings, said structures having a high strength-to-weight ratio.

Another object is to provide a novel method whereby parts of an aircraft wing can be fabricated on inexpensive molds.

A further object is to provide a novel method of reinforcing structures fabricated in accordance with the above method.

Still another object is to provide a novel method of fabricating the entire shell of a hollow, elongated member, such as a flap or aileron, in a single molding operation.

A still further object is to provide a novel laminated airfoil having reinforcing members novelly secured to the skin thereof.

Another object is to provide a novel method for eliminating surface irregularities in a reinforced molded structure without decreasing the strength of said structure.

A still further object is to form in a novel manner the framework and skin of an airfoil.

The above and other objects and novel features of this invention will more fully appear from the following detailed description when the latter is read in connection with the accompanying drawings. It is to be expressly understood, however, that the drawings are for the purpose of illustration only and are not intended as a definition of the limits of the invention, reference being primarily had for this latter purpose to the appended claims.

In the drawings, wherein like reference characters refer to like parts throughout the several views, Fig. 1 is a top plan view of an airplane wing fabricated according to the method of the present invention;

Fig. 2 is a sectional view taken substantially along line 2—2 of Fig. 1;

Fig. 3 is a fragmentary sectional view of a reinforcing member located in a mold and the manner of superposing skin laminations on said mold over said member;

Fig. 4 is a view similar to Fig. 3, showing the above parts after molding;

Fig. 5 is a sectional view taken along line 5—5 showing one type of attachment for securing wing sections to each other;

Fig. 11 is a sectional view taken along line 11—11 of Fig. 1 showing another section of the wing;

Fig. 12 is a view in perspective of a portion of a mold upon which the wing section of Fig. 11 may be formed;

Fig. 13 is an exploded perspective view of a portion of the mold of Fig. 12 and of a preformed frame member adapted to be positioned on said portion;

Fig. 14 is an exploded perspective view of a mold and the laminations adapted to be assembled thereon in order to be formed into still another section of the wing;

Fig. 15 is a perspective view of two sections of the wing which are adapted to be attached to each other;

Fig. 16 is a perspective view of a portion of the mold upon which a trailing section of the wing may be formed;

Fig. 17 is a perspective view of a segment of said trailing section;

Fig. 18 is a perspective view of a mold upon which an aileron may be fabricated;

Fig. 19 is a perspective view with parts broken away of the mold of Fig. 18 with laminations assembled thereon and molded, said view being taken substantially along line 19—19 of Fig. 18;

Fig. 20 is a top plan view of a mold for carrying out the fabrication of another embodiment of a wing section, such as an aileron;

Fig. 21 is a sectional view taken along line

Figure 6:
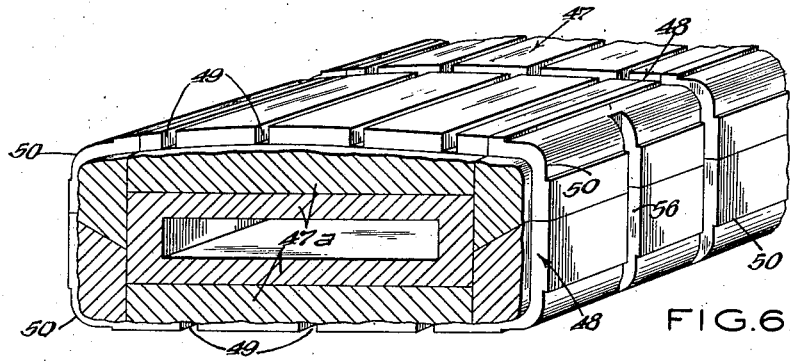
Fig. 6 is a perspective view of a portion of a type of mold or form on which the central part of the wing of Fig. 1 may be fabricated.

21—21 of Fig. 20, with a laminated structure assembled on the mold;

Fig. 22 is a perspective view with parts broken away of a portion of the aileron formed on the mold of Fig. 20;

Fig. 23 is a view in side elevation of a mold on which the leading edge of the wing of Fig. 1 may be formed;

Fig. 24 is a sectional view taken substantially along line 24—24 of Fig. 23;

Fig. 25 is a sectional view taken substantially along line 25—25 of Fig. 23;

Fig. 26 is a view in perspective of a preformed rib member adapted to constitute a part of the framework of the nose section;

Fig. 27 is a similar view to Fig. 25 with the rib member of Fig. 26 positioned for molding;

Fig. 28 is a perspective view of a portion of the nose section;

Fig. 29 is a top plan view of a mold for forming a section of the wing tip;

Fig. 30 is a similar view of a mold for forming another section of said tip; and Fig. 31 is an exploded view of the several parts of the wing tip.

According to the novel method comprehended by the present invention, a structural member, such as an aircraft wing, is novelly formed in one or more sections from a plurality of adhesively treated laminations of a material such as wood veneer. The laminations are shaped and bonded together by a molding operation which preferably includes the application of heat and fluid pressure but which may be accomplished by the application of pressure only. The molded sections are removed from the mold and joined together to form the complete wing structure either mechanically or by a local molding carried out by mechanical presses.

The veneer sheets which are utilized to carry out the method have a thickness which depends on the desired weight, thickness and structural strength of the member being formed therefrom, for example, when a member having a high strength-to-weight ratio is to be formed, thin sheets from 1/45" to 1/8" are used in a sufficient number of layers to give the requisite strength, whereas to form a thick structure requiring little shaping it is satisfactory to employ sheets having a thickness of 1/4" or more. In the fabrication of aircraft parts, such as wings, weight must be maintained at a minimum and, accordingly, thin sheets are used. Furthermore, although solid strips could be used as reinforcing or frame members, it is preferable first to form said strips and other reinforcing members from veneer laminations, a plurality of said members, wherever possible, being molded by the same molding method as a block from which block the members are sawed or otherwise removed.

The sheets of material are treated with a suitable adhesive, preferably of the thermoplastic or thermosetting group, as, for example, polyvinyl butyral. It is also possible to employ other adhesives, for example, of the type adapted to be set by chemical reaction and requiring the application of pressure only during molding, such as urea formaldehyde. The use of the latter type of adhesive is somewhat less satisfactory because the initial molding requires more care and time, and in the event molded structures are to be joined to each other by a further molding operation, said molded structures have to be retreated with adhesive at their junctions.

The adhesive is applied to the sheets, preferably in a sufficient quantity to impregnate and coat the same in any suitable manner, as, for example, by being sprayed or painted thereon or by dipping the sheets in the adhesive. After the adhesive is applied, the sheets are permitted to season for several hours and then if a more thorough impregnation and coating is desired the application of the adhesive and the seasoning are repeated one or more times. In the fabrication of a structure having curved surfaces from sheets impregnated with a thermoplastic, it is preferable to mix a plasticizer, such as dibutyl phthalate, with the adhesive to make the impregnated sheets more flexible, the quantity of plasticizer added to the thermoplastic varying inversely as the radius of curvature of the shape into which the veneer sheets are to be formed.

The novel aircraft wing fabricated according to the novel method of the present invention comprises a beam section 40 (Fig. 1) located intermediate the leading and trailing edges of the wing and extending longitudinally, i. e., in the direction of the wing span, for almost the entire length of said span, said beam section constituting the main support for the wing. A leading edge or nose section 41 is secured to the forward edge of beam section 40 and trailing edge or tail sections 42 and 43 are secured to the rear edge of said beam section, trailing edge section 42 having a flap 44 hinged thereon, and section 43 having an aileron 45 associated therewith. A separate tip section 46 is also provided and is adapted to be secured to the end of beam section 40 and to constitute the tip of the wing.

Figure 7:
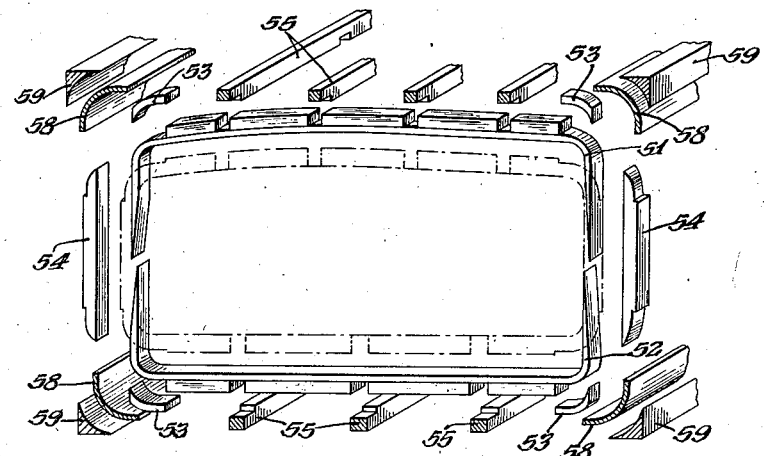
Fig. 7 is an exploded perspective view showing the parts comprising the framework of a wing section.
Figure 8:
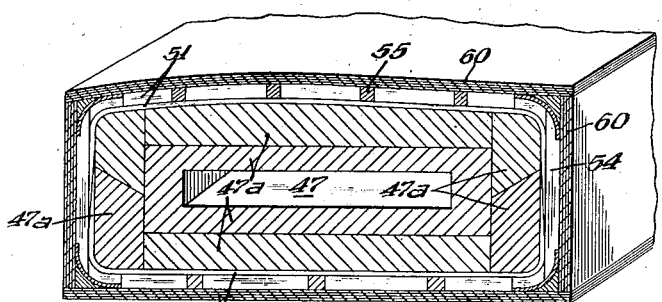
Fig. 8 is a perspective view showing the parts of the wing section assembled on the mold of Fig. 6.
Figure 9:
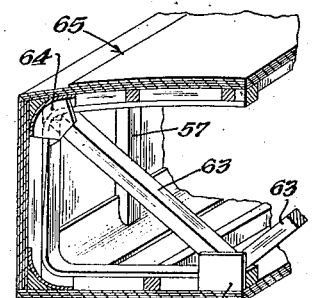
Fig. 9 is a perspective view of a fragment of the molded section.
Figure 10:
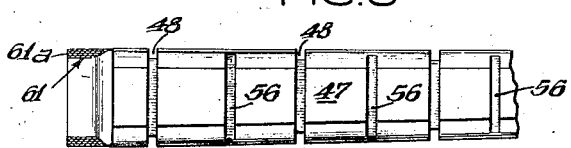
Fig. 10 is a view in side elevation with parts broken away of the mold of Fig. 6.

Beam section 40 is formed on a mold 47 (Fig. 6) provided with transverse recesses 48 located where reinforcing frames for the beam are desired and longitudinal grooves or recesses 49 which intersect said transverse recesses and extend substantially the length of the beam, the spacing of recesses 48 and 49 and the length of the latter recesses being determined by the desired strength and rigidity of the beam section. Mold 47 is provided with rounded edges and has an indentation or recess 50 at each of said edges and is preferably formed in several parts 47a in order to be readily removable from the structure molded thereon. The mold is first rendered non-adhesive by being covered with a non-adhesive material, such as Cellophane or cellulose acetate, or with sheets of veneer that have the surfaces thereof in engagement with said mold free of adhesive. Transverse grooves 48 are then filled with a pair of laminated U-shaped frame members 51 and 52 (Fig. 7), corner pieces 53 and side pieces 54, said frame members being recessed so as to interlock with strips 55 which are adapted to fill grooves 49 and which are also recessed. Indentations 50 at each edge of mold 47 are filled with arcuate strips 58 which preferably extend the length of said mold and a filler strip 59 to "square off" the edges is provided at each of the mold edges being positioned over each of said arcuate strips. It is preferable to provide a side reinforcing strip between each pair of transverse frames and grooves 56 (Figs. 6 and 10) are provided for this purpose in order to receive side pieces 57 (Fig. 9).

Thereafter, a plurality of adhesively treated sheets of veneer 60 are superposed on the four sides of mold 47 and are temporarily secured to the mold by any suitable means, such as cleats or belts (not shown). The aggregate thickness of the veneer layers may progressively diminish toward the beam tip, i. e., some of the layers may terminate at a predetermined distance from the tip. In order to further strengthen the broad end of beam section 40, an internal flange of sheets of veneer is built up by providing a depressed portion 61 in the end of mold 47 which may be filled with strips of 61a before veneer sheets 60 are positioned.

When the above-described structure is properly assembled on the mold in the above-described manner and the exposed surfaces are rendered non-adhesive, for example, by being coated with cellulose acetate, the assembly and the mold are subjected to a molding operation which includes the application of pressure whereby the laminations are caused to closely conform to the mold shape while the adhesive is actuated and caused to set. This is preferably accomplished by inserting the mold and the assembly thereon into a flexible, substantially impervious container and then placing said container into a pressure chamber wherein said container is preferably subjected to fluid pressure. The interior of the container is in communication with the exterior of the chamber so that the pressure in the latter will exhaust said container and cause the walls thereof to closely engage the laminations on the mold. The pressure is preferably applied by introducing compressed air and/or steam into the chamber, the steam or other heating medium being used when the laminations have been treated with thermoplastic or thermosetting adhesives and heat is desired for activating the adhesive. The pressure remains applied until the adhesive has set and then the mold and the structure molded thereon are removed from the chamber and from the container.

Heretofore the fabrication of reinforced laminated structures on molds has resulted in the production of either ridges or hollows in the skin of the structure due to the irregularities in the thickness of the reinforcing members which either fail to fill or project beyond the grooves provided therefor. To overcome this effect without decreasing the skin strength in the products of the present invention, it is proposed to locate one or more extra strips 62 (Figs. 3 and 4) of laminated material over the top lamination at each of the grooves containing reinforcing members and to use reinforcing members which are somewhat undersized, said strips being of a width substantially equal to or slightly greater than the width of said grooves. As a result, when the structure is molded, although a hollow is provided in the skin of the structure, this hollow is filled with these extra laminations. The portion of the latter which projects beyond the skin surface is thereafter removed without decreasing the skin strength and this removal can be readily accomplished, for example, by a sand-papering machine.

After beam section 40 has been molded and the mold removed, one or more of the transverse frames may be further strengthened by braces 63, two of which are preferably wedged in a V-shape on the interior of each of said frames (Fig. 9), said braces being secured to said frames by means of gusset plates 64. In order that the leading and trailing sections may be properly affixed to the beam section, i. e., caused to telescopically engage the latter and produce a smooth skin surface at the joint, recesses 65 are cut, for example, by a routing machine, in the upper and lower faces of said beam section adjacent each edge of the latter. It will be understood that these recesses could also be produced by having outer laminations of a lesser width covering the upper and lower faces of the beam section, said outer laminations being centrally located relative to the others.

Trailing section 42 to which flap 44 is hingedly secured (Fig. 11) is formed together with its reinforcing webs or ribs 66 upon a mold 67 (Fig. 12). As shown, the latter comprises a base portion 68 and a plurality of similarly shaped sections 69, each of which consists of two parts 69a and 69b, the latter mold part (Fig. 13) having one face thereof conforming to one side of rib 66 and having slots 70 located in said face to receive stiffeners 71, which are preferably formed with said rib. A plurality of recesses 72 exists between mold parts 69a and 69b of adjacent sections 69 and each of said recesses is adapted to receive the web 73 of one of ribs 66. Indentations 74 are provided in the sides of each of mold parts 69b in order to receive flanges 75 of said ribs and strips 76 are provided to fill in the spaces which exist between the rounded edges of said ribs and parts 69a. With rib assembly 66, 76 properly positioned on mold 67 and a strip 77 located at the tip of said mold and extending along the length thereof, skin laminations are superposed on the mold faces, flanges 75 of the ribs which are substantially flush with the faces of the mold being engaged by said skin laminations. Laminations 78 (Figs. 11 and 15) corresponding to the upper skin are positioned so as to cover the entire face of the mold, whereas laminations 79 which form the lower skin cover only the portion of the mold face, as shown in Fig. 12, below 80 in order to form a space 81 in trailing section 42 which is adapted to receive flap 44. The mold and the assembly thereon are then subjected to the steps of a molding process similar to that carried out in order to mold section 40 and thereafter a beam 82 is positioned between the rearmost portion of skin 79 and ribs 66 and provides a support to which one side of a hinge 83 is secured by suitable means, such as screws 84. The portions of the skin 78, 79 of section 42 (Fig. 11) which extend beyond the end of ribs 66, i. e., the portions of the skin laminations molded on base 68, are adapted to overlap beam section 40 and fit into recesses 65, said portions being secured to said beam section by being molded thereto, as, for example, by a mechanical press P having a heating coil C associated therewith.

Flap 44 is preferably formed on a mold 85 which provides for the positioning of reinforcing members 86 at the trailing edge of said flap, said members being molded together with and therefore bonded to skin laminations 87 which are superposed on both sides of the mold. A U-shaped member 88 ((Fig. 15) extending the length of said flap and preferably premolded to the desired shape from a plurality of adhesively treated laminations is located between the sides 87 of said flap at the leading edge thereof, said member being adhesively secured to said sides, for example, by a heating press. Flap 44 is then attached to the free side of hinge 83 and is controlled by means well-known in the art, openings 66a being provided in ribs 66 to permit said control means to extend through trailing section 42. Flap 44 may be formed with skin laminations on the lower side thereof only, i. e., skin laminations 87 are superposed only on one side of mold 85 prior to molding.

Trailing section 43 is formed on a mold 89, the latter comprising an assembly of sections substantially similar to the sections constituting mold 67. As shown, mold 89 consists of a base portion 90 and sections 91 which have recesses 92 formed therebetween for receiving a plurality of ribs 93 (Fig. 16), each of said ribs comprising a web portion 93a and flanges 93b. A pair of reinforcing strips 94 are located along the edges of the portion of said mold corresponding to the trailing edge and filler strips, not shown, similar to strips 76 of trailing section 42 are provided for the same purpose as the latter strips. Thereafter, skin laminations 95 are positioned on three sides of said mold and the entire mold assembly molded into the structural unit (Fig. 17) which constitutes trailing section 43. The mold is then removed from said unit and the latter is preferably secured to beam section 40 by the application of heat and pressure which bonds skin 95 to the upper and lower surfaces of section 40 along recesses 65 (Fig. 2).

Aileron 45, which is associated with trailing section 43, being pivotally mounted to the rear thereof, is formed in a novel manner on a mold 96 (Fig. 18), the latter being shaped to conform to the interior of said aileron and being provided on both sides with a plurality of grooves 97, each of which extends from the trailing edge to within a short distance of the leading edge of said mold. Grooves 97 are preferably flared at each end and the group of said grooves on the top side of mold 96 is adapted to receive reinforcing members 98a (Fig. 19) while the grooves on the bottom side receive members 98b, said members being shaped to fit said grooves. The thickness of said members is greater than the depth of said grooves, except for the portions thereof which are overlapped by laminations 99, the latter being positioned to cover the leading edge of said mold. By varying the thickness of members 98a and 98b in this manner, the joint between said members and laminations 99 produces a smooth outer surface over which additional veneer laminations may be positioned to constitute the skin of said aileron when molded. However, in order to balance the aileron and properly locate the center of gravity thereof, it is preferable that members 98a and 98b be covered with a fabric, such as canvas. The canvas by being treated with adhesive may be molded together with laminations 99 and members 98a, 98b in a single molding operation of the kind hereinafter described, but is preferably attached to said laminations and members by means of an adhesive after the latter have been molded. Accordingly, after said laminations and members are positioned on mold 96, the same are subjected to a molding process and bonded into a structural unit, reinforcing members 98a being prevented from adhering to members 98b at the trailing edge by mold 96 which separates said members. Mold 96 is removed from the structure molded thereon in a novel manner by lifting members 98a and 98b from said mold, thus separating the two sides of the molded structure and permitting the withdrawal of the mold from the rear of said structure, the latter being sufficiently resilient to permit this displacement and to thereafter return to the shape imparted to it by the molding operation. It is to be noted that the entire shell structure of an elongated enclosed member, such as a flap or aileron, may thus be shaped and fabricated on a mold from a plurality of adhesively treated elements, all of the parts of said member being bonded to each other except along a single line extending the length of said mold. After the removal of mold 96, a strip 100 is adhesively secured to the free ends of members 98a, 98b, and a U-shaped reinforcing piece 101 is preferably fixed between the ends of leading edge 99. Canvas skin 102 is positioned over framework 98a, 98b, 99 to complete the aileron structure.

Another aileron embodiment 111 (Figs. 21, 22) may be formed upon a mold 103 (Fig. 20), the latter comprising a nose portion 104 which is indented relative to a trailing portion 105 which has a plurality of angularly disposed grooves 106 therein. Grooves 106 are filled with reinforcing ribs 107 having a thickness substantially equal to the depth of said grooves and indented nose portion 105 is covered with lamination 108. Thereafter, a plurality of skin laminations 109 are positioned to cover mold 103 and the assembly thereon with portions of said laminations projecting a short distance beyond the trailing edge of said mold, said projecting portions being separated by a pair of strips 110 which are, in turn, separated by a suitable non-adhesive material, such as Cellophane or cellulose acetate. The entire airfoil structure is formed in a single molding operation and after fabrication the two sides of the skin are separated to permit the removal of the mold. Strips 110 are then bonded together to complete the formation of airfoil section 111.

The nose or leading edge portion 41 of the wing is fabricated on a mold 112 comprising a tip portion 113, a base 114 and a plurality of sections 115 located between said tip and base portions, each of said sections consisting of two parts 115a and 115b. Sections 115 are positioned so as to produce a plurality of recesses 117 therebetween and said recesses are adapted to receive a plurality of ribs 116 (Fig. 26).

A selected number of said ribs may be provided with stiffeners 118 (Fig. 26) and in the illustrated embodiment alternate ribs are so provided and, accordingly, alternate sections 115 are provided with slots 119 to receive said stiffeners. Filler strips 120 are utilized in a manner hereinbefore described to fill the groove remaining in the mold faces after the positioning of ribs 116 (Fig. 27). Thereafter a formed arcuate tip or nose piece 121 of a length equal to the length of leading edge section 41 is positioned as a single piece or in sections on mold 112 to cover tip portion 113 of said mold. It is to be understood that instead of separately molding nose piece 121, the latter may be formed simultaneously with the skin of section 41 by superposing a plurality of adhesively treated sheets over said tip portion of the mold. The mold is then covered with veneer laminations 122 and all the parts assembled on the mold are bonded into a unitary structure (Fig. 28). This structure which constitutes nose section 41 of the wing is then adhesively secured to leading edge of beam section 40 (Figs. 1 and 2), preferably by means of a mechanical press in the same manner as trailing section 42 is secured to the trailing edge of said beam.

Tip section 46 of the wing is preferably fabricated in several parts and is preferably assembled into a unit before being secured to the remainder of the wing. However, the tip may be an integral part of the main wing section, fabricated and molded at the same time. As shown, said tip section comprises a leading portion 46a, a trailing portion 46b, and a beam or central portion 46c to which said two first-named portions are adhesively attached. Trailing portion 46b is formed on a mold 123 (Fig. 29), said mold comprising sections 124 having recesses 124a therebetween adapted to receive reinforcing ribs 125 and an edge section 126 adapted to position the laminations comprising an edge reinforcing strip 127, said edge section being preferably formed in several parts to facilitate the removal thereof from the structure molded thereon. A base section 128 is also a part of said mold and the portions of skin laminations 129 which cover said base section constitute the skin portions which are attached to central section 46c, the latter being readily formed, for example, on a simple mold.

The leading portion 46a is formed on a mold 130 which although shaped differently is constituted of a plurality of parts which are essentially like those of mold 123, producing a laminated structure having a skin 131 of the desired shape and being provided with a reinforcing strip 132 and ribs 133. Portion 46a is attached to central section 46c in the same way as section 46b and the resulting structure is secured to the wing, preferably by mechanical means. This is accomplished by mechanically or adhesively attaching a flange 134 on the interior of beam 40 along the edge thereof adjacent tip 46 and likewise providing a flange 135 on central section 46c of said tip (Fig. 5), said flanges being rigidly fixed to each other by suitable means, such as bolts 136.

During or after the assembly of the wing, it may be desirable to reach into the interior thereof, for example, in order to secure tip 46 in position or to locate and attach the flap and aileron controls, and for this purpose a plurality of conveniently located hand openings 137, the veneer sills of which are molded to the skin, is provided in the lower wing surface, each of said openings having a cover which is preferably hinged to the wing skin.

There is thus provided a novel method of fabricating a wing for an aircraft, said wing being comprised of a plurality of novel separately molded sections which may be adhesively and/or mechanically secured to each other.

There is also provided a novel method of fabricating an elongated shell structure, such as an aileron, in a single molding operation and a novel method whereby a smooth skin is provided on an airfoil wing even though said wing is molded from laminations of adhesively treated materials and is provided with adhesively secured reinforcing members.

Although only a single embodiment of the invention has been illustrated and described, it is to be expressly understood that the same is not limited thereto. For example, it will now be apparent that a central section of similar construction and fabricated by the same method as the above-described wing panels may be attached thereto to form a complete wing. Furthermore, the main beam of said central section or of said panels may be partitioned off to be used as a gas tank. Various other changes may be made in the design and arrangement of parts without departing from the spirit and scope of the invention. For a definition of the invention, reference will be had primarily to the appended claims.

What is claimed is:

1. In a wing, a beam substantially rectangular in chordwise cross-section constituting the main spanwise support for said wing, said beam comprising a laminated skin of adhesively bonded sheet material wholly enclosing an internal reinforcing structure, said reinforcing structure comprising a plurality of chordwise extending, spanwise spaced, substantially rectangular frames each comprising at least a pair of substantially U-shaped laminated sectionse of adhesively bonded sheet material, the arms and cross-piece of each said U-shaped section being of relatively small cross-sectional area and the sections of each pair being adhesively bonded to each other and to said skin; and, a plurality of spanwise extending, laminated stringers of adhesively bonded sheet material, said stringers being of relatively small cross-sectional area and in interlocking engagement with successive frames and being adhesively bonded to said frames and to said skin to provide a unitary reinforcing structure.

2. In a wing, a beam as defined by claim 1 in which the arms of one frame section of each said pair have a tapered surface in overlapping adhesively bonded engagement with a correspondingly tapered surface of the other frame section of the pair and in which a reinforcing contour member is adhesively bonded to each pair of overlapped arms.

EUGENE L. VIDAL.
LAURENCE J. MARHOEFER.